(12) United States Patent
Vaidya et al.

(10) Patent No.: US 10,929,650 B2
(45) Date of Patent: Feb. 23, 2021

(54) ACTIVITY BASED VIDEO RECORDING

(71) Applicant: Ooma, Inc., Sunnyvale, CA (US)

(72) Inventors: Govind Vaidya, San Mateo, CA (US); Shaival Shah, San Mateo, CA (US)

(73) Assignee: Ooma, Inc., Sunnyvale, CA (US)

( * ) Notice: Subject to any disclaimer, the term of this patent is extended or adjusted under 35 U.S.C. 154(b) by 0 days.

(21) Appl. No.: 16/182,483

(22) Filed: Nov. 6, 2018

(65) Prior Publication Data

US 2019/0141298 A1    May 9, 2019

Related U.S. Application Data

(60) Provisional application No. 62/582,919, filed on Nov. 7, 2017, provisional application No. 62/585,686, filed (Continued)

(51) Int. Cl.
| | |
|---|---|
| *G06K 9/00* | (2006.01) |
| *G10L 25/51* | (2013.01) |
| *H04N 7/18* | (2006.01) |
| *H04N 5/91* | (2006.01) |
| *H04N 5/77* | (2006.01) |
| *H04N 9/82* | (2006.01) |
| *G08B 13/196* | (2006.01) |
| *H04N 5/232* | (2006.01) |

(Continued)

(52) U.S. Cl.
CPC ..... *G06K 9/00288* (2013.01); *G06K 9/00228* (2013.01); *G06K 9/00268* (2013.01); *G06K 9/00718* (2013.01); *G08B 13/19695* (2013.01); *G10L 25/51* (2013.01); *G11B 27/036* (2013.01); *H04N 5/23241* (2013.01); *H04N 5/23245* (2013.01); *H04N 5/77* (2013.01); *H04N 5/772* (2013.01); *H04N 5/91* (2013.01); *H04N 7/183* (2013.01); *H04N 7/188* (2013.01); *H04N 9/8205* (2013.01); *H04R 1/04* (2013.01); *H04R 1/326* (2013.01); *G06K 9/00221* (2013.01); *G06K 9/00771* (2013.01); *G08B 13/19671* (2013.01); *H04R 2499/11* (2013.01)

(58) Field of Classification Search
CPC ................. G06K 9/00288; G06K 9/00228
See application file for complete search history.

(56) References Cited

U.S. PATENT DOCUMENTS

| | | | |
|---|---|---|---|
| 6,831,556 B1 | 12/2004 | Boykin | |
| 7,129,872 B1 * | 10/2006 | Qvortrup | .............. H03M 1/124 341/139 |

(Continued)

OTHER PUBLICATIONS

David Houldings, high Sensitivity Aruino sound Level Detector, Jan. 2014.*

*Primary Examiner* — Girumsew Wendmagegn
(74) *Attorney, Agent, or Firm* — Carr & Ferrell LLP

(57) ABSTRACT

Methods and systems for activity based video recording are provided. Exemplary methods include: receiving an amplified signal to improve sensitivity, the amplified signal being produced by a circuit using an analog differential signal, the analog differential signal being received from a microphone; converting the amplified signal to a digital signal; detecting the digital signal; activating a video camera to record video for a predetermined amount of time using the detecting; storing the recorded video; placing the video camera into power saving mode.

19 Claims, 8 Drawing Sheets

Related U.S. Application Data on Nov. 14, 2017, provisional application No. 62/583,875, filed on Nov. 9, 2017.

(51) Int. Cl.
  *H04R 1/04* (2006.01)
  *H04R 1/32* (2006.01)
  *G11B 27/036* (2006.01)

(56) References Cited

U.S. PATENT DOCUMENTS

| | | |
|---|---|---|
| 7,859,571 B1 | 12/2010 | Brown et al. |
| 9,906,722 B1 | 2/2018 | Gigot |
| 10,115,029 B1 | 10/2018 | Day et al. |
| 10,372,995 B2 | 8/2019 | Zhang et al. |
| 10,872,231 B2 | 12/2020 | Vaidya et al. |
| 2004/0247284 A1 | 12/2004 | Yamasaki |
| 2006/0221184 A1 | 10/2006 | Vallone et al. |
| 2007/0035632 A1 | 2/2007 | Silvernail et al. |
| 2007/0185989 A1 | 8/2007 | Corbett et al. |
| 2008/0224862 A1 | 9/2008 | Cirker |
| 2008/0278580 A1 | 11/2008 | Bentkovski |
| 2008/0297602 A1* | 12/2008 | Chang ............... G08B 13/19676 348/162 |
| 2008/0319604 A1 | 12/2008 | Follmer et al. |
| 2010/0287053 A1 | 11/2010 | Ganong et al. |
| 2013/0215266 A1 | 8/2013 | Trundle et al. |
| 2014/0328578 A1 | 11/2014 | Shafron et al. |
| 2015/0286875 A1 | 10/2015 | Land et al. |
| 2015/0358537 A1 | 12/2015 | Mirza |
| 2016/0050396 A1 | 2/2016 | Gali et al. |
| 2016/0105644 A1 | 4/2016 | Smith et al. |
| 2016/0253883 A1 | 9/2016 | Westmacott et al. |
| 2016/0277759 A1 | 9/2016 | Edpalm et al. |
| 2017/0154638 A1* | 6/2017 | Hwang ............... G06K 9/00711 |
| 2017/0339343 A1 | 11/2017 | Zhang et al. |
| 2017/0358322 A1 | 12/2017 | Wiklof |
| 2017/0374284 A1 | 12/2017 | Shao |
| 2018/0206043 A1* | 7/2018 | Gabai ............... H03F 1/56 |
| 2018/0268674 A1 | 9/2018 | Siminoff |
| 2019/0138795 A1 | 5/2019 | Vaidya |
| 2019/0141297 A1 | 5/2019 | Vaidya et al. |
| 2020/0388139 A1 | 12/2020 | Saha et al. |

* cited by examiner

ACTIVITY BASED VIDEO RECORDING

CROSS-REFERENCE TO RELATED APPLICATIONS

This application claims the benefit of U.S. Provisional Application No. 62/582,919 filed on Nov. 7, 2017, U.S. Provisional Application No. 62/585,686 filed on Nov. 14, 2017, and U.S. Provisional Application No. 62/583,875 filed on Nov. 9, 2017, the disclosures of which are incorporated by reference herein for all purposes.

FIELD OF THE INVENTION

The present technology pertains to audio and video recording and more specifically to activity-based audio and video recording.

BACKGROUND ART

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Traditional security cameras have been utilized for surveillance of physical spaces. Typically, such conventional cameras record video of a space for the entire time they are on, which may be twenty-four hours a day, seven days a week. Because of this continuous recording of surveillance of physical spaces, enormous amounts of video data are produced and must be stored, which can prove to be costly. Also, the enormous amounts of video data produced by conventional security cameras will require hours and hours of time for a human to review, which is also costly and time-consuming. Furthermore, the human review of the video data can turn out to be fruitless, because such a human review may ultimately show that no significant event happened in the physical space for the time period reviewed.

SUMMARY OF THE INVENTION

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various systems and methods for activity based video recording. Specifically, a method for activity based video recording may comprise: receiving an amplified signal to improve sensitivity, the amplified signal being produced by a circuit using an analog differential signal, the analog differential signal being received from a microphone; converting the amplified signal to a digital signal; detecting the digital signal; activating a video camera to record video for a predetermined amount of time using the detecting; storing the recorded video; placing the video camera into power saving mode.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
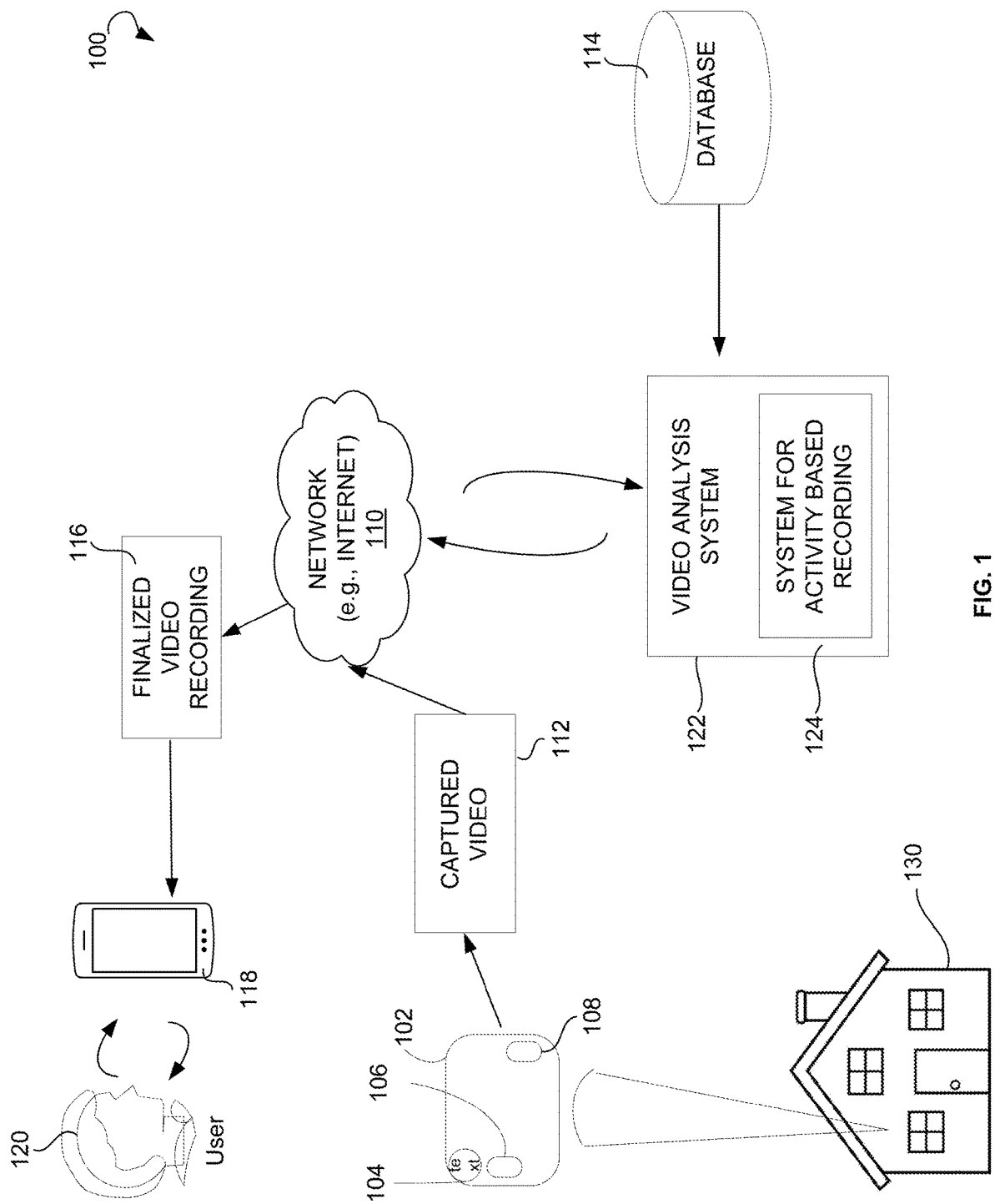
FIG. 1 is a simplified block diagram of an environment for activity based audio and video recording, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. Like or analogous elements and/or components, referred to herein, may be identified throughout the drawings with like reference characters. In addition, several of the figures are merely schematic representations of the present technology. As such, some of the components may have been distorted from their actual scale for pictorial clarity.

The disclosure relates to activity based audio and video recording. Instead of recording 24 hours a day, an exemplary camera system for activity based recording includes a camera that has the intelligence to determine when it should record and when it should not record. In some exemplary embodiments, the camera as a source can determine when a significant event or activity is occurring which requires camera recording.

Activity Based Recording (ABR) provides a smart and automated method to enable and disable the camera recording, such that potentially significant events or activities are detected and recorded. After recording the potentially significant event or activity, the ABR camera system will restore the camera to a low power state, which will reduce the power consumption of the device, until the arrival of the next significant event. Due to the automated nature of ABR, it is particularly useful in situations where the camera is unattended, especially in cases where the camera and the camera user are not co-located.

The ABR camera system allows a consumer-friendly camera to be deployed in a physical space, such as a house, office building, other room, backyard, and the like. The camera, through use of specially designed hardware and specially programmed software, can record short video clips when a triggering event (activity) is detected by one or more sensors on the camera, such as the camera sensor (also known as the image sensor), and/or sound circuitry in a microphone on the camera. This method provides a smart and automated way to enable and disable a camera recording, so that only potentially significant events are detected and recorded, thus eliminating many hours of recorded video of an empty space without activity.

In some embodiments, the camera "listens" for a trigger that indicates that the camera should begin recording. Instead of recording video 24 hours a day, the camera will build intelligence which is stored as instructions to be processed by a processor, and by way of this intelligence, it can determine if a significant event is occurring that requires or warrants a video recording or for the camera recorder to turn on, based on the data it receives from the one or more sensors. The one or more sensors may send data to the camera that they have been activated (by image, by sound, by motion, etc.). In some embodiments, the camera will have two auxiliary sensors, for example, a motion sensor and a sound sensor (transducer such as a microphone). When activity is determined using signals from any of the auxiliary sensors, the camera begins recording.

In some embodiments, the ABR camera system includes a (low-power) microcontroller that manages the state of the camera and a powerful camera processor that processes the images captured by the camera. The microcontroller manages the states of the camera so that the camera processor is enabled and capturing events based on inputs from the sensors mentioned herein. The microcontroller can be a System on a Chip (SoC), which is an integrated circuit (also known as a "chip") that integrates components of a computer or other electronic system. These components can include a central processing unit (CPU), memory, input/output ports, and secondary storage—all on a single substrate. An SoC may contain digital, analog, mixed-signal, and often radio frequency signal processing functions. The microcontroller can be a special-purpose processor, due to its combination of components and functions. As they are integrated on a single electronic substrate, SoCs consume much less power and take up much less area than multi-chip designs having equivalent functionality. The microcontroller can manage the input from the sensors, and controls the camera subsystem depending on the sensor input. As explained below, the camera subsystem can include the camera lens, the camera sensors, and the camera microcontroller.

When there are no significant events (activity) to be recorded, the microcontroller can shut down the camera processor to save power, and puts itself in a low power state to reduce power consumption. The microcontroller can monitor the sensors while in a low power state, and proceed to wake up and enable the camera processor based on the inputs from the sensors. The microcontroller can be programmed to take the sensors' input to turn on the camera subsystem to enable (audio and) video capture when activity (a trigger) is detected. A timer that can be built into the microcontroller that can signal to the microcontroller when the trigger(s) from the sensor(s) has expired or when no trigger(s) occurs and a predetermined time period has elapsed. When this happens, the microcontroller can shut down the camera subsystem, until the next trigger(s) from the sensor(s) arrives.

The timer can be included in the microcontroller. The timer is used by the microcontroller to trigger the transition from a capture state to a low power state after some time has elapsed, in the event that the sensors do not detect new activity.

By way of example and not limitation, an ABR camera system can recognize that in a particular physical space, such as a conference room, there may be hours and hours of no activity during the daytime, but that at night during a certain time period, the conference room will have regularly scheduled activity in the form of cleaners cleaning the room. The intelligent camera can recognize that this cleaning activity by the cleaners is not a significant event that warrants video recording.

In another example, the ABR camera system can hear and detect a loud banging noise. The ABR camera system can also detect that although there is a loud banging noise, no person is present in the physical space. Because the ABR camera system is intelligent, it determines that the camera should begin to record audio and video simultaneously. The ABR camera system can include a camera sensor and complimentary auxiliary sensors (such as a microphone) which can help to detect if an activity is significant enough to be recorded by the camera system. The complimentary auxiliary sensors help to provide the intelligence in the camera system, since the microphone can detect sound. The microphone's sensitivity level (e.g., by amplifying an audio signal sensed by the microphone) can be adjusted using electronic components in the ABR camera system. Furthermore, a sound level threshold for activity detection (e.g., in decibels) can be specified, sounds in the physical space can be sensed and/or otherwise processed by instructions stored in a processor (e.g., microcontroller) of the camera system.

When one of the sensors detects activity (a triggering event), the camera system can begin recording. Furthermore, after the ABR camera system detects the triggering event and records a video recording, it can add additional video frames to the video recording. In various embodiments, the camera system will prepend the additional video frames to the beginning of the video recording. For instance, the ABR camera system can add two to five seconds of stored historical frames to the beginning of the video recording. Those stored historical video frames provide video immediately prior to the detection of the triggering event. In some embodiments, those historical frames are stored in a buffer (e.g., Random Access Memory (RAM)) associated with the camera. For example, the RAM is configured as first in first out (FIFO) memory. Any amount or time frame of historical frames of (valuable) data can be added to the video recording, and that adding two to five seconds of historical frames to a video recording is a non-limiting example.

In some embodiments, the ABR camera system can listen/detect sound or analyze infrared data, and after analyzing the data, the camera system can determine that a significant event occurred and start a video recording. The ABR camera system will add the historical video frames to the video recording, thus providing the valuable data of the potentially significant event or activity to the user.

At least these features of an ABR camera system are in contrast with conventional camera systems, which record events based on a simple enable/disable switch. A conventional camera system records if enabled; otherwise it does not record. When the conventional camera system is left enabled, it records all events, all the time. Usually only a small portion of all the recordings are meaningful, but the amount of time required to shift through all the recordings is substantial. In addition, the "always on" recording by a conventional camera system generates an enormous amount of data, which requires significant bandwidth to transport and significant storage space to store. In addition, if the camera is battery powered, this "always on" mode can consume a substantial amount of power, significantly reducing the battery life of the camera. Conversely, if the conventional camera is disabled, the user might miss some significant events. To prevent this, the user will be forced to always be on guard to manually enable the camera at the desired moment.

When an activity occurs, such as motion, the conventional camera systems turn on and begin recording, but they traditionally miss the significant activity or event because of a lag time between the time it detected an activity and the time it began the video recording. Conventional camera systems may fail to record a portion or the entire significant event or activity, as they do not store historical video frames that can be added from the buffer to the video recording, or they may record insignificant events.

For instance, with conventional camera systems, a sound may occur, and when the conventional camera systems determines the sound represents activity, the camera system begins to record. Since there is a delay between detecting activity and recording, conventional camera systems can easily miss the important or significant activity or events that should have been recorded.

FIG. 1 illustrates an environment 100 within which activity based recording for camera applications can be implemented, in accordance with some embodiments. The environment 100 may include camera 102 containing camera lens 104 and camera sensor(s) 106. Camera lens 104 can be a custom capsule-shaped camera lens. Camera 102 can also include complimentary auxiliary sensors, such as microphone 108. Microphone 108 can be a transducer and operate as a sound capture device. Microphone 108 can also detect noise levels above a certain threshold (e.g., in decibels). Electronics (described below in relation to FIG. 3) can be used to amplify signals received by microphone 108 (e.g., effectively adjusting a sensitivity of microphone 108).

Camera 102 may be deployed in physical space 130, such as a house. According to various embodiments, camera 102 also has one or more additional components (not explicitly shown in FIG. 1) that enable its operation for the purposes of the present disclosure.

Captured video 112 from camera 102 may be transmitted via network 110 to cloud video analysis system 122, which may include system for activity based recording 124. Cloud video analysis system 122 may further utilize database 114 and one or more computing processors and volatile- and/or non-volatile memory.

After processing captured video 112, system for activity based recording 124 may generate finalized video recording 116, which is transmitted through network 110 to an application operating on user device 118, which in turn can be viewed by a user 120. Each of these components is discussed in further detail below.

Camera 102 may be deployed in any physical space 130 to record audio and/or video around the physical space 130. While physical space 130 is depicted as a house, camera 102 may be deployed in any physical space, such as an office building, a conference room, a room, or any other space. In addition, while only one of camera 102 is depicted in FIG. 1 for simplicity, there can be any number of cameras in physical space 130. If multiple cameras are located in physical space 130, one or more of the cameras may be in wireless communication with one another, in exemplary embodiments. Further, while camera 102 is depicted in FIG. 1 as a standalone device, in other embodiments, the camera 102 may be incorporated as a part of other electronic devices. For example, the camera 102 may be incorporated as part of a smartphone, tablet, intelligent personal assistant, or other smart electronic device.

Figure 2:
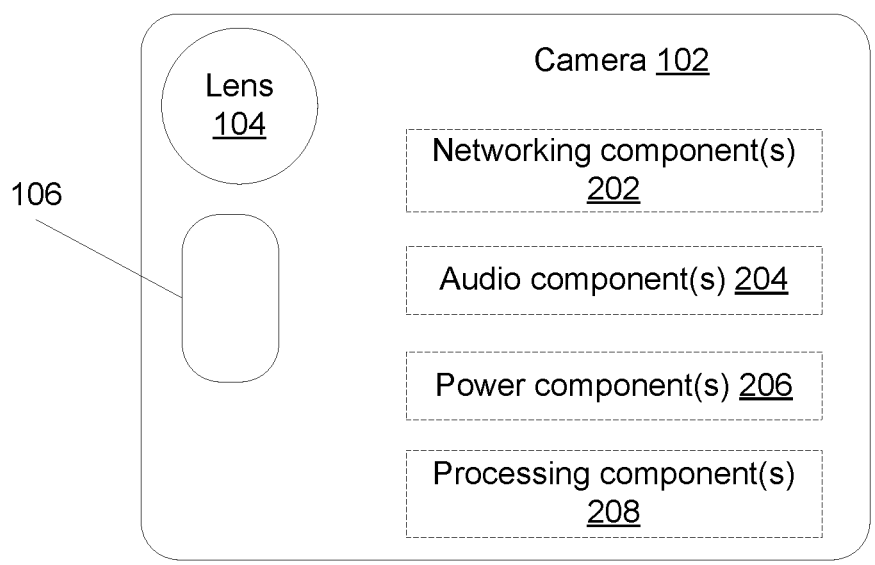
FIG. 2 is a simplified block diagram of a camera for activity based recording, according to various embodiments.

Camera 102 is described in further detail with respect to FIG. 2. In various embodiments, camera 102 is a consumer-friendly camera that can be utilized by a human user without needing to have any specialized camera expertise. Camera 102 can include one or more lens 104, with which video is captured. In some embodiments, lens 104 may be any type of lens typically found in consumer cameras, such as a standard prime lens, zoom lens, and wide angle lens. In some embodiments, lens 104 can be a custom capsule lens.

Camera 102 includes one or more sensors. The sensors of the ABR camera system may be used to "wake up" the camera subsystem from a low power state, so that it may proceed in capturing video and audio data. The sensor(s) may be any type of sensor to monitor conditions around the camera 102. By way of non-limiting example, the sensor 106 may comprise one or more of a camera sensor 106, a PIR (passive infrared) sensor that can bring to life colored night vision, a motion sensor (e.g., accelerometer), a temperature sensor, a humidity sensor, a GPS, and the like.

Microphone 108 can advantageously be an omnidirectional microphone. Since microphone 108 can be located outside of a critical distance, it's less important to gain before feedback (GBF), and it can have excellent low-frequency response, which make an omnidirectional microphone better suited for some embodiments than a unidirectional microphone. GBF is a measure of how much a microphone can be amplified in a sound reinforcement system before causing audio feedback. Moreover with an omnidirectional microphone, there is no chance of speaking outside polar patterns and the omnidirectional microphone can be placed on the right side up end of the camera and it can still hear (e.g., detect sounds) equally well in all directions.

The camera system may have any number of auxiliary sensors, and such auxiliary sensors can turn a camera itself or a video recording on or off. For example, an auxiliary sensor is an accelerometer that could inform the user of the camera systems status, such as when a person picks up the camera (i.e., camera starts to move), if the camera has been moved, if an earthquake has happened, or if a person has approached from behind to remove the camera from the user. Using the accelerometer, the camera system can use motion detection to turn on the camera to record.

The camera system can also send a message, alert, or message notification to the user that their camera was moved (or other activity was detected. Once activity has been determined and in addition to recording, the camera system can send an alarm notification, notify an alarm system, notify an alarm central monitoring station, turn on interior and/or exterior lights, lock smart locks, and the like.

Referring to FIG. 2, camera 102 can have additional components that enable its operation. For example, camera 102 may have power component(s) 206. Power component(s) 206 may comprise an electrical connector interface for electronically coupling a power source to, or for providing power to camera 102. Electrical connector interface may comprise, for example, an electrical cable (the electrical cable can be any of a charging cable, a FireWire cable, a USB cable, a micro-USB cable, a USB-C cable, a Lightning (connector) cable, a retractable cable, a waterproof cable, a cable that is coated/covered with a material that would prevent an animal from chewing through to the electrical wiring, and combinations thereof), electrical ports (such as a USB port, micro-USB port, microSD port, USB-C port, etc.), a connector for batteries (including rechargeable battery, non-rechargeable battery, battery packs, external chargers, portable power banks, etc.), and other power source used to provide electricity/power to small electronic devices.

According to some embodiments, power component(s) 206 comprises at least one battery provided within a housing unit. The battery may also have a wireless connection capability for wireless charging, or induction charging capabilities.

Camera 102 can also include audio component(s) 204. In various embodiments, audio component(s) 204 may comprise one or more transducers such as microphones for receiving, recording, and transmitting audio. Audio component(s) 204 can also include other electronics for sound detection and analysis, such as will be described below in relation to FIG. 3.

Camera 102 further can have processing component(s) 208 to enable it to perform processing functions discussed herein. Processing component(s) 208 may comprise at least one processor (microcontroller), static or main memory, and software such as firmware that is stored on the memory and executed by a processor. Processing component(s) 208 may further comprise a timer (not shown in FIG. 2) that operates in conjunction with the functions disclosed herein. As previously mentioned, camera lens 104, camera sensor 106, and camera processor 208 may collectively be called the camera subsystem.

In various embodiments, a specialized video processor is utilized with a hardware accelerator and specially programmed firmware to identify triggering events, begin recording audio and/or video (e.g., in Standard Definition or High Definition), cease recording of audio and/or video, process the captured video frames and insert metadata information regarding the specific video frame(s), and transmit the recorded audio, video, and metadata to video analysis system 122 operating via software in a cloud computing environment.

Camera 102 can also include networking component(s) 202, to enable camera 102 to connect to network 110 in a wired or wireless manner. Further, networking component(s) 202 may also allow for remote control of the camera 102.

In come embodiments, the networking communication capability of the camera 102 can be achieved via an antenna attached to any portion of the camera 102, and/or via a physical network interface. The camera 102 may communicate with network 110 via wired and/or wireless communication capabilities, such as radio frequency, Bluetooth, ZigBee, Wi-Fi, electromagnetic wave, RFID (radio frequency identification), etc.

Human user 120 may further interact with, and control certain operations of camera 102 via a graphical user interface displayed on user device 118. The graphical user interface can be accessed by human user 120 via a web browser on user device 118 (e.g., a desktop or laptop computer, netbook, smartphone, tablet, etc.). Human user 120 may further interact with, and control certain operations of camera 102 via a custom/dedicated software application on a smartphone, tablet, smartwatch, laptop or desktop computer, or any other computing device with a processor (or other electronics) that is capable of wireless communication. In other embodiments, human user 120 can interact with and control certain operations of camera 102 via a software application utilized by human user 120 for controlling and monitoring other aspects of a residential or commercial building, such as a security system, home monitoring system for Internet-enabled appliances, voice assistant such as Amazon Echo, Google Home, etc.

Turning back to FIG. 1, camera 102 captures video as discussed herein. Captured video 112 is then transmitted to video analysis system 122 via network 110. Network 110 may include the Internet or any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection.

In addition, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network can further include or interface with any one or more of an RS-232 serial connection, an IEEE-1394 (FireWire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking.

Network 110 may be a network of data processing nodes that are interconnected for the purpose of data communication. Network 110 may include any suitable number and type of devices (e.g., routers and switches) for forwarding commands, content, requests, and/or responses between each user device 118, each camera 102, and video analysis system 122.

Video analysis system 122 may include a server-based distributed software application. Thus, video analysis system 122 may include a central component residing on a server and one or more client applications residing on one or more user devices and communicating with the central component via the network 110. User 120 may communicate with video analysis system 122 via a client application available through user device 118.

Video analysis system 122 may comprise software application(s) for processing captured video 112, as well as other capabilities. Video analysis system 122 can be further in communication with one or more data structures, such as database 114. In exemplary embodiments, at least some components of the video analysis system 122 operate on one or more cloud computing devices or servers.

Video analysis system 122 can further comprise system for activity based recording 124. System for activity based recording 124 analyzes captured video 112 and metadata associated with captured video 112. Through the analysis, which consists of one or more software algorithms executed by at least one processor, system for activity based recording 124 will add historical video frames to captured video 112. In some embodiments, the added historical video frames are those video frames that were stored in a buffer memory (e.g., RAM). The video frames can be time-stamped, such that video frames of a predetermined time preceding the start of the captured video can be added by system for activity based recording 124. The adding of the historical video frames to the captured video results in finalized video recording 116. Finalized video recording 116 is then transmitted by system for activity based recording 124, through network 110, to user device 118, at which point it can be viewed by a user. In some embodiments, additional information may be transmitted with finalized video recording 116, such as a copy of the face image from captured video 112, and/or other information associated with captured video 112 or finalized video recording 116.

Finalized recording 116 can be displayed via a user interface on a screen of user device 118, in the format of a pop-up alert, text message, e-mail message, or any other means of communicating with user 120.

User device 118, in some example embodiments, may include Graphical User Interface for displaying the user interface associated with system 122. User device 118 may include a mobile telephone, a desktop personal computer (PC), a laptop computer, a smartphone, a tablet, a smartwatch, intelligent personal assistant device, smart appliance, and the like.

Figure 3:
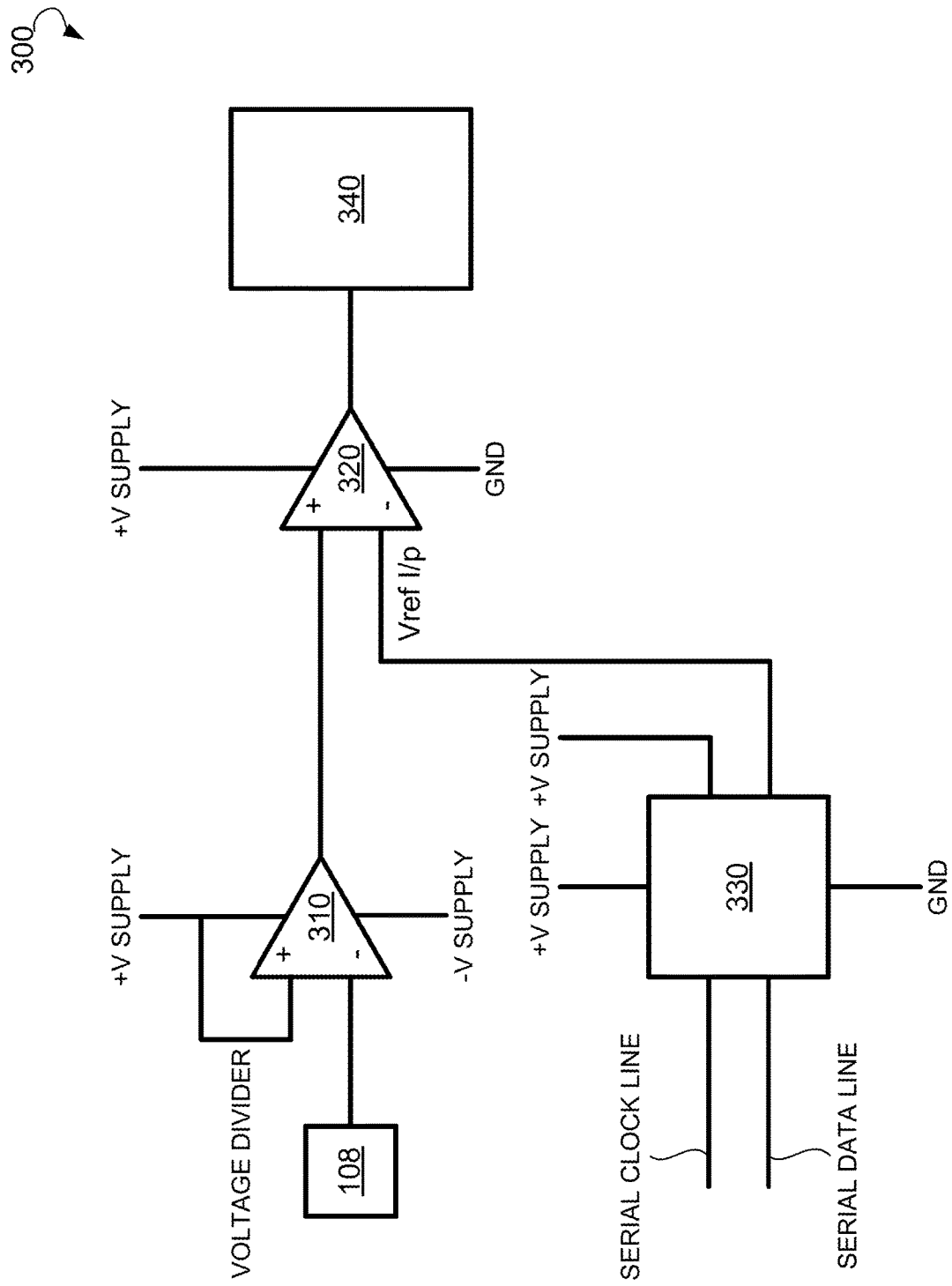
FIG. 3 is a simplified schematic diagram of a subsystem for audio signal processing, in accordance with some embodiments.

FIG. 3 illustrates a simplified block diagram of subsystem 300 for audio signal processing. In some embodiments, subsystem 300 can amplify sound sensed by microphone 108, effectively adjusting the sensitivity of microphone 108. Subsystem 300 can be (at least partially) included in camera 102 (FIGS. 1 and 2). Subsystem 300 can include microphone 108, operational amplifier (opamp) 310, opamp 320, (digital) potentiometer 330, and microcontroller 340. By way of non-limiting example, microphone 108 can be an (analog) omnidirectional microphone with a signal-to-noise ratio (SNR) of more than 60 dB and a sensitivity of −40±3 dB at 1 KHz. SNR is the ratio of signal power to noise power, which can be expressed in decibels. By way of further non-limiting example, microphone 108 can operate with a power supply less than 5V DC. In some embodiments, microphone 108 can operate with a roughly 2V DC power supply. In contrast, most off the shelf microphones operate at 8-12V DC.

An operational amplifier (opamp) is a DC-coupled high-gain electronic voltage amplifier with a differential input and a single-ended output. Here, an opamp produces an output potential (relative to circuit ground) that is typically hundreds of thousands of times larger than the potential difference between its input terminals. Opamp 310 can receive signals from microphone 108 as a differential pair. Signals received from microphone 108 are provided to opamp 310, which can operate as a high-gain buffer. Opamp 310 then provides the resulting signal to opamp 320, which can operate as a comparator.

Opamp 320 also receives an output of digital potentiometer 330. Digital potentiometer 330 is a digitally-controlled electronic component that mimics the analog functions of a potentiometer (variable resistor). Digital potentiometer 330 can be controlled using an interface, such as Inter-Integrated Circuit (I²C) (e.g., SERIAL CLOCK LINE and SERIAL DATA LINE signals are shown as examples in FIG. 3). I²C is a synchronous, multi-master, multi-slave, packet switched, single-ended, serial computer bus. Digital potentiometer 330 can be used to adjust the sensitivity of microphone 108, so that minute sounds at low frequencies can be tracked.

The output of opamp 320 can go through a flip-flop or analog-to-digital converter (ADC) (not depicted in FIG. 3). The resulting analog signal can be provided to microcontroller 340 (e.g., microcontroller in camera 102 of FIGS. 1 and 2). In some embodiments, microcontroller 340 can include the ADC. Microcontroller 340 can analyze a decibel level of the sound detected by microphone 108, to determine if there is activity.

Figure 4:
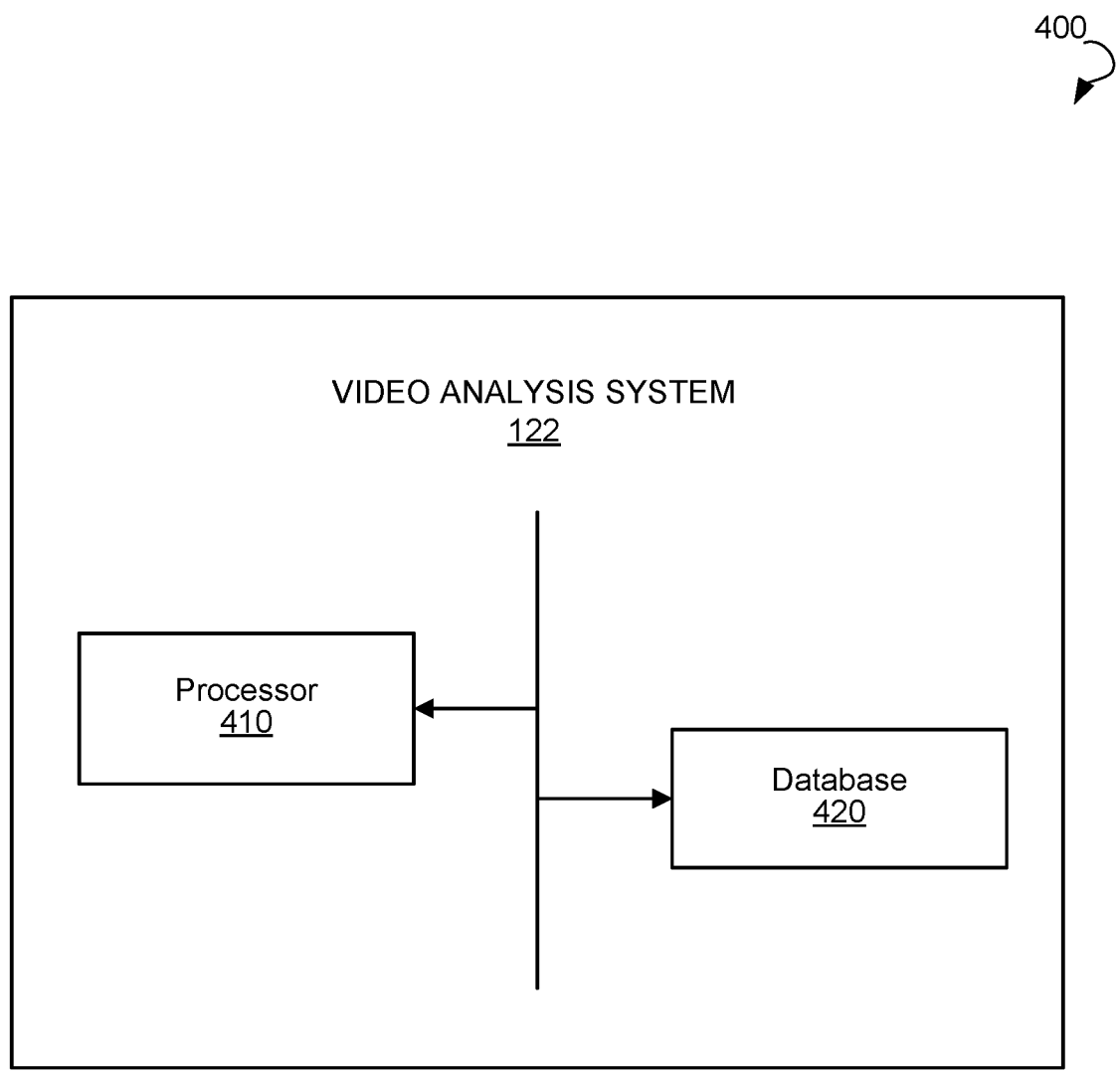
FIG. 4 depicts a various modules of a video analysis system, in accordance with various embodiments.

FIG. 4 is a block diagram showing various modules of video analysis system 122 for processing captured video 112, in accordance with certain embodiments. System 112 can include processor 410 and database 420. Database 420 can include computer-readable instructions for execution by processor 410. Processor 410 may include a programmable processor, such as a microcontroller (microcontroller 340), central processing unit (CPU), and so forth. In various embodiments, processor 410 may include an application-specific integrated circuit (ASIC), field programmable gate array (FPGA), application-specific standard product (ASSP), an electronic circuit, system on a chip (SoC), a processor (shared, dedicated, or group), and the like that executes one or more software or firmware programs, a combinational logic circuit, and/or other suitable components to implement the functions performed by system 122. In various embodiments, system 122 may be installed on a user device or may be provided as a cloud service residing in a cloud storage.

Figure 5:
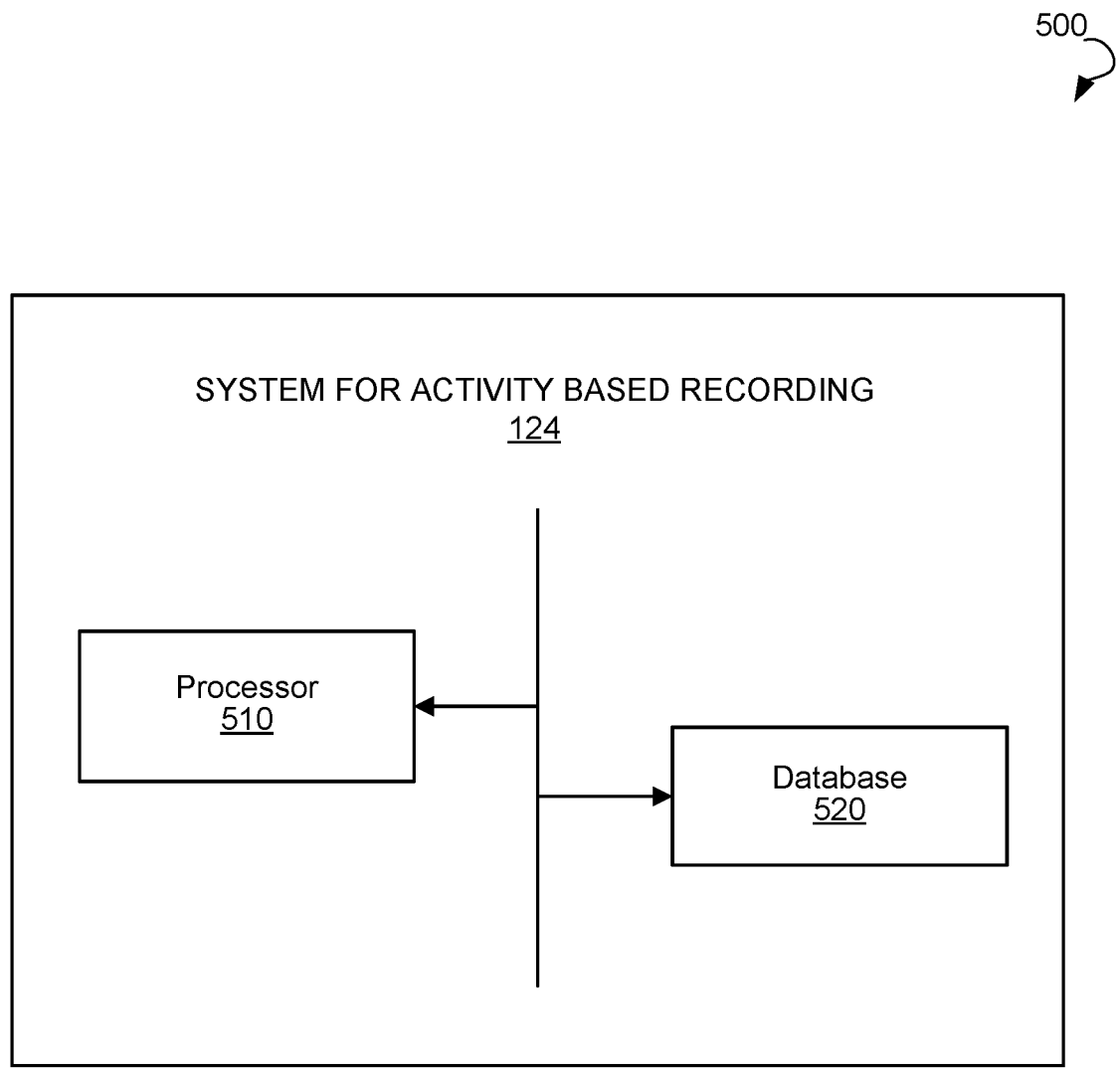
FIG. 5 shows various modules of a system for activity based recording, according to some embodiments.

FIG. 5 is a block diagram showing various modules of system for activity based recording 124, in accordance with certain embodiments. System 124 may include processor 510 and database 520. Processor 510 of the system for activity based recording 124 may be the same, or different from processor 410 of the video analysis system 122. Further, database 520 of the system for activity based recording 124 may be the same or different than database 420 of the video analysis system 122.

Database 520 may include computer-readable instructions for execution by processor 510. Processor 510 may include a programmable processor, such as a microcontroller (microcontroller 340), central processing unit (CPU), and so forth. In various embodiments, processor 510 may include an application-specific integrated circuit (ASIC), field programmable gate array (FPGA), application-specific standard product (ASSP), an electronic circuit, system on a chip (SoC), a processor (shared, dedicated, or group), and the like that executes one or more software or firmware programs, a combinational logic circuit, and/or other suitable components to implement the functions performed by system 122. In various embodiments, system 122 may be installed on a user device or may be provided as a cloud service residing in cloud storage.

Figure 6:
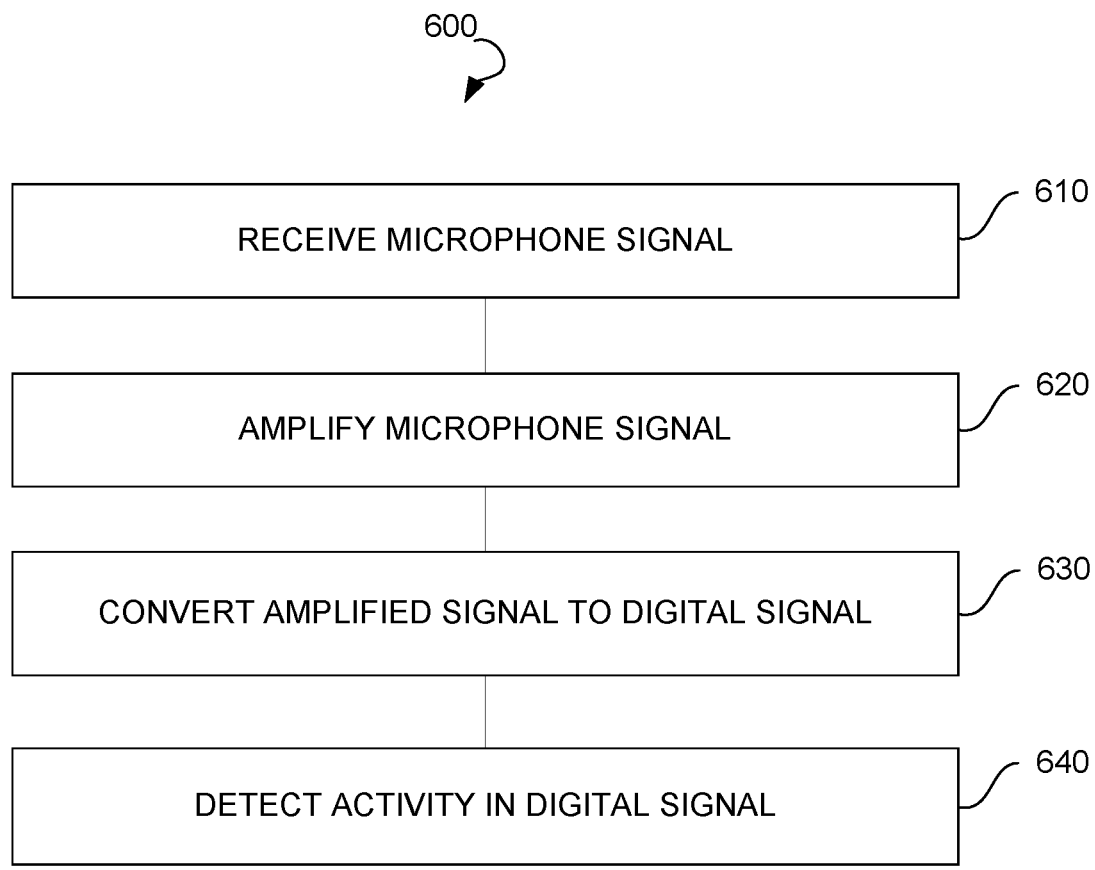
FIG. 6 illustrates a flow diagram of a method for activity detection, according to various embodiments.

FIG. 6 shows method 600 for activity detection. According to some embodiments, method 600 can be performed (at least partially) by electronics 300 described above in relation to FIG. 3. At step 310, a signal from a transducer can be received. For example, an analog differential signal can be received from microphone 108. At step 320, the received signal is amplified to improve sensitivity. At step 330, the amplified signal can be converted to a digital signal.

At step 340, activity can be detected using the digital signal. Activity can be sounds sensed by microphone 108 which are not common for physical space 130, such as, screaming/yelling/shouting, glass breaking, explosion, crash, slamming, siren, noise made by animals (e.g., barking, howling, screeching, etc.), and the like. An activity can be determined to have occurred when the sound sensed by microphone 108 exceeds a predetermined threshold and/or occurs for a period of time longer than another predetermined threshold (e.g., in range between 5 seconds and 50 seconds).

Figure 7:
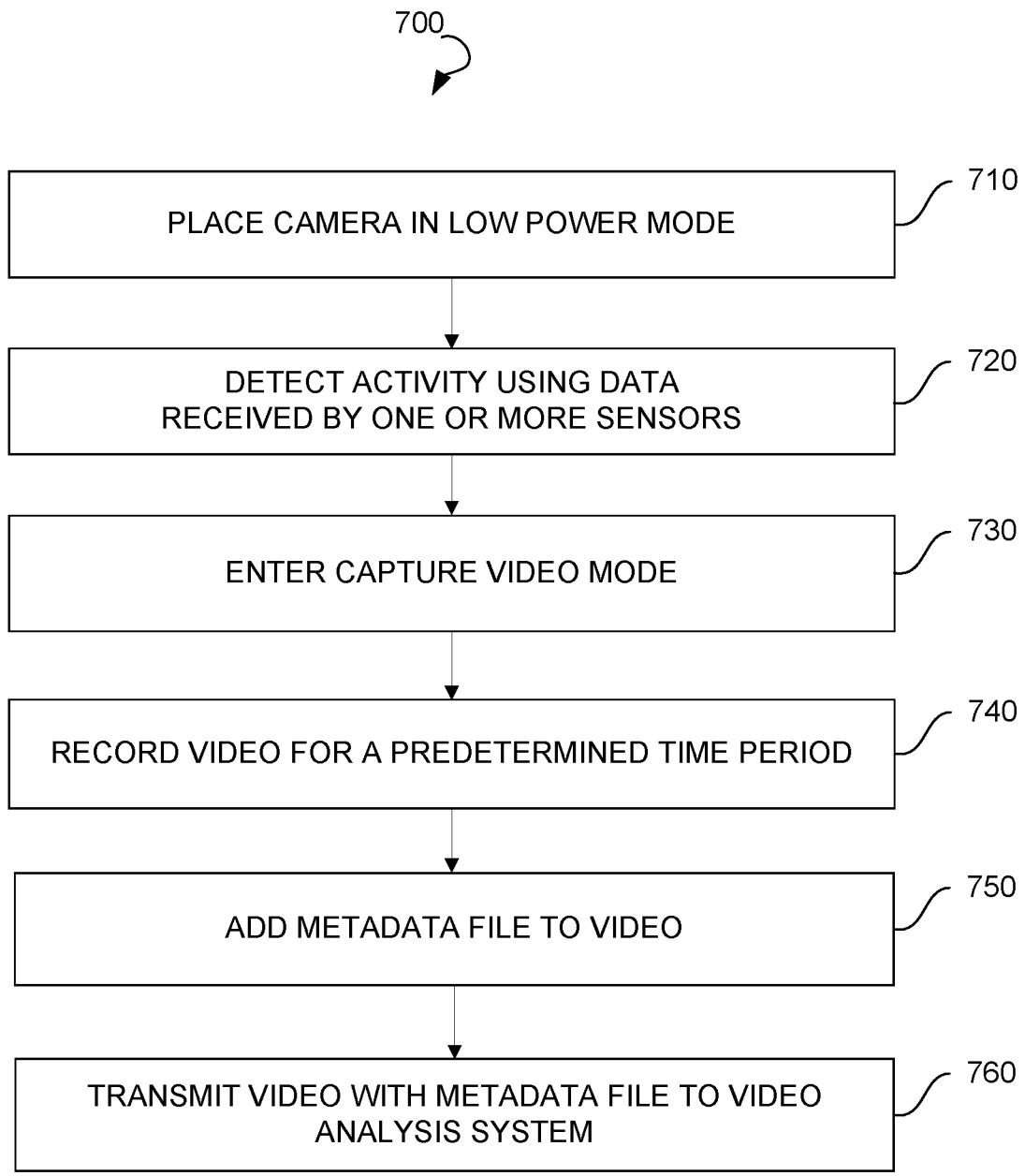
FIG. 7 is a simplified flow diagram of a method for activity based recording, in accordance with some embodiments.

FIG. 7 is a process flow diagram showing method 700 for activity based recording using a camera system, within the environment described with reference to FIG. 1. In some embodiments, the operations may be combined, performed in parallel, or performed in a different order. Method 700 may also include additional or fewer operations than those illustrated. Method 700 may be performed by processing logic that may comprise hardware (e.g., decision making logic, dedicated logic, programmable logic, and microcode), hardware accelerator, software (such as firmware on camera 102 or other software run on a special-purpose computer system), or any combination of the above.

The method 700 may commence with user 120 turning on camera 102. When user 120 turns on camera 102, camera 102 boots and camera 102 enters a low power mode 710 to save on power consumption. Booting is starting up camera 102 until it can be used. Booting can be initiated by hardware such as a button press or by software command. In some embodiments, a first processor (e.g., microcontroller 340) and a first memory cause camera 102 to enter the low power mode. Then, camera 102 waits for activity to be detected while in low power mode. At this stage, the camera subsystem is powered down.

Then, the camera system detects activity based on data received by one or more sensors of camera 102 at operation 720. In some embodiments, the sensors can include camera sensor 106, a passive infrared (PIR) sensor, and microphone 108. The activity can be detected by one or more sensors, including the complimentary auxiliary sensors, in the camera system. In an example, the camera system includes a camera sensor and two complimentary auxiliary sensors, namely, a passive IR sensor and a microphone. The passive IR sensor is configured to receive information, such as detecting motion. In some embodiments, the microphone of the camera system can detect analog sound, which enters into a transducer for the analog sound to be converted into digital, such as in method 600 (FIG. 6).

In some embodiments, the camera system utilizes all three sensors (the camera (CMOS) sensor, the passive IR sensor, and the microphone). All three sensors work in concert to detect motion, listen for sounds, detect heat (such as body heat), detect changes in temperature, and analyze an image of a space or room to see if there is a change in the space or room that triggers a recording. In other words, all three sensors work in concert to determine if there has been activity. The camera system can use various combinations and permutations of complimentary sensors and a camera to detect activity.

As discussed herein, camera 102 may be located in a physical space 130 and powered on, but not be actively recording video and/or audio. Detecting activity can cause camera 102 to begin recording.

In an example embodiment, activity is detected using sound/noise sensed by a microphone 108 on camera 102 above a certain decibel threshold. The camera system 100 may include time and/or decibel profiles for the auxiliary camera sensors. In another example embodiment, activity is detected using a noise sensed by microphone 108 on camera 102 within a certain time period. In other example embodiments, activity is detected using sensing of motion, temperature, smoke, humidity, gaseous substance, or any other environmental condition above/below a preset threshold, or occurring within a preset time period. The preset threshold may be configured by a manufacturer of camera 102, or configured by user 120.

Upon detection of activity, camera 102 enters capture video and/or audio mode at operation 730 for a certain predetermined time period. In some embodiments, the first processor and the first memory causes the camera to enter the capture video mode. When camera 102 is in captured mode, the camera subsystem is powered on. In some embodiments, the capture mode may be enabled on camera 102 for an amount of time that is pre-configured by a manufacturer of camera 102, or pre-configured by user 120. Further, the predetermined time period that capture mode is enabled on camera 102 may be variable based on the type of triggering event, time of day, or any other criterion. In various embodiments, capture mode is enabled on camera 102 for a predetermined period of time in range between 5 seconds and 50 seconds.

At operation 740, video is recorded by camera 102 onto memory within camera 102 hardware, resulting in a captured video. The predetermined time period for recording video in response to detecting activity may be less than one minute. Further, substantially simultaneously, recorded video is processed by firmware on a specialized video processor hardware and/or hardware accelerator within camera 102. The firmware processes recorded video. It also may optionally detect select video frames within the recorded video that contain a human face or are likely to contain a human face.

When activity is detected, the camera remains in capture mode and video continues to be recorded. In some embodiments, the video is recorded by the camera 102 until activity is no longer detected by the one or more sensors, and the predetermined time period for capturing video has elapsed. Once the video recording has stopped, the camera system enters the low power mode and the camera system waits and "listens" for the next activity to signal that a further video recording should take place. Thus, the steps of method 700 may be repeated in a loop, producing multiple videos of potentially significant events or activities while the camera system is operational.

Information regarding the video recording is added to metadata associated with the video recording, at operation 750. Such information may include the date and time that the video clip was taken. Other information may include the spatial location of the camera at the time that the video clip was taken and/or information of which sensor(s) associated with the camera triggered the video recording.

Subsequently, the captured or recorded video and the metadata file are transmitted to video analysis system 122 for further analysis, at operation 760. The metadata file may include data that was received from the one or more of the camera sensors. In various embodiments, camera 102 is in wireless communication with video analysis system 122 and operation 760 occurs in a wireless manner. In some embodiments, the transmission occurs via a wired communication network. In various embodiments, video analysis system 122 may be executed by a module within the camera 102 itself.

Figure 8:
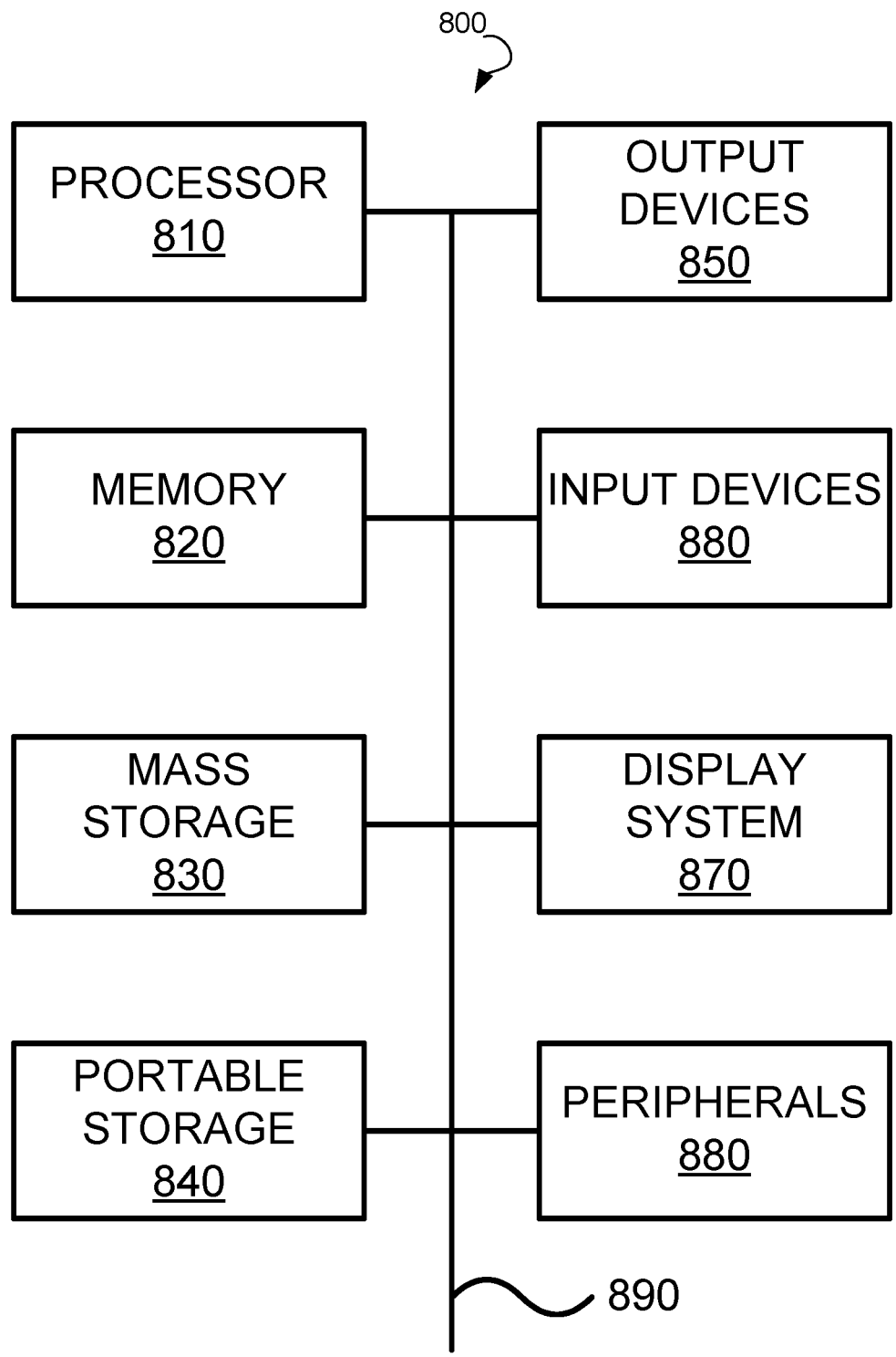
FIG. 8 is a simplified block diagram of a computing system, in accordance with various embodiments.

FIG. 8 illustrates an exemplary computer system 800 that may be used to implement some embodiments of the present invention. The computer system 800 in FIG. 8 may be implemented in the contexts of the likes of computing systems, networks, servers, or combinations thereof. The computer system 800 in FIG. 8 includes one or more processor unit(s) 810 and main memory 820. Main memory 820 stores, in part, instructions and data for execution by processor unit(s) 810. Main memory 820 stores the executable code when in operation, in this example. The computer system 800 in FIG. 8 further includes a mass data storage 830, portable storage device 840, output devices 850, user input devices 860, a graphics display system 870, and peripheral device(s) 880.

The components shown in FIG. 8 are depicted as being connected via a single bus 890. The components may be connected through one or more data transport means. Processor unit(s) 810 and main memory 820 are connected via a local microprocessor bus, and the mass data storage 830, peripheral device(s) 880, portable storage device 840, and graphics display system 870 are connected via one or more input/output (I/O) buses.

Mass data storage 830, which can be implemented with a magnetic disk drive, solid state drive, or an optical disk drive, is a non-volatile storage device for storing data and instructions for use by processor unit(s) 810. Mass data storage 830 stores the system software for implementing embodiments of the present disclosure for purposes of loading that software into main memory 820.

Portable storage device 840 operates in conjunction with a portable non-volatile storage medium, such as a flash drive, floppy disk, compact disk, digital video disc, or Universal Serial Bus (USB) storage device, to input and output data and code to and from the computer system 800 in FIG. 8. The system software for implementing embodiments of the present disclosure is stored on such a portable medium and input to the computer system 800 via the portable storage device 840.

User input devices 860 can provide a portion of a user interface. User input devices 860 may include one or more microphones, an alphanumeric keypad, such as a keyboard, for inputting alphanumeric and other information, or a pointing device, such as a mouse, a trackball, stylus, or cursor direction keys. User input devices 860 can also include a touchscreen. Additionally, the computer system 800 as shown in FIG. 8 includes output devices 850. Suitable output devices 850 include speakers, printers, network interfaces, and monitors.

Graphics display system 870 include a liquid crystal display (LCD) or other suitable display device. Graphics display system 870 is configurable to receive textual and graphical information and processes the information for output to the display device.

Peripheral device(s) 880 may include any type of computer support device to add additional functionality to the computer system.

Some of the components provided in the computer system 800 in FIG. 8 can be those typically found in computer systems that may be suitable for use with embodiments of the present disclosure and are intended to represent a broad category of such computer components. Thus, the computer system 800 in FIG. 8 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 800 may be implemented as a cloud-based computing environment, such as a virtual machine operating within a computing cloud. In other embodiments, the computing system 800 may itself include a cloud-based computing environment, where the functionalities of the computing system 800 are executed in a distributed fashion. Thus, the computing system 800, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 800, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for activity based video recording comprising:
    receiving an amplified signal to improve sensitivity, the amplified signal being produced by a circuit using an analog differential signal, the analog differential signal being received from a microphone, the circuit comprising:
        a first opamp receiving the analog differential signal from the microphone,
        a second opamp coupled to the first opamp, and
        a digital potentiometer coupled to the second opamp;
    converting the amplified signal to a digital signal;
    intelligently detecting that a triggering event or activity is occurring that warrants a video recording, using the digital signal;
    causing a camera to enter a capture video mode comprising a variable enabled period based on a detected type of the triggering event or activity, the variable enabled period comprising a predetermined period for the camera to remain in the capture video mode for the detected type of triggering event or activity;
    recording video in response to detecting the triggering event or activity, resulting in a captured video;
    storing the recorded video;
    prepending a plurality of time-stamped historical video frames to the recorded video; and
    placing the camera into power saving mode.

2. The computer-implemented method of claim 1, wherein the microphone is an omnidirectional microphone disposed on the video camera.

3. The computer-implemented method of claim 2, wherein the microphone has an SNR greater than 60 dB.

4. The computer-implemented method of claim 3, wherein the microphone operates using a voltage supply less than 3V DC.

5. The computer-implemented method of claim 4, wherein the microphone has a sensitivity of −40±3 dB at 1 KHz.

6. The computer-implemented method of claim 1, wherein the detected triggering event or activity can be at least one of a scream, shouting, and breaking glass.

7. The computer-implemented method of claim 1, wherein the detected triggering event or activity can be at least one of an explosion, crash, slamming, siren, and noise made by an animal.

8. The computer implemented method of claim 1, wherein the predetermined period is within a range between 5 seconds and 30 seconds.

9. The computer implemented method of claim 1, further comprising:
receiving an indication to power on the camera; and
booting the camera.

10. A system for activity based video recording, the system comprising:
a microphone providing an analog differential signal;
an analog circuit amplifying the analog differential signal, the analog circuit comprising:
a first opamp receiving the analog differential signal from the microphone,
a second opamp coupled to the first opamp, and
a digital potentiometer coupled to the second opamp;
a flip-flop converting the amplified analog differential signal to a digital signal; and
a microcontroller of a camera:
intelligently detecting that a triggering event or activity is occurring that warrants a video recording, using the digital signal;
causing a camera to enter a capture video mode comprising a variable enabled period based on a detected type of the triggering event or activity, the variable enabled period comprising a predetermined period for the camera to remain in the capture video mode for the detected type of triggering event or activity;
recording video in response to detecting the triggering event or activity, resulting in a captured video;
storing the recorded video;
prepending a plurality of time-stamped historical video frames to the recorded video; and
placing the camera into power saving mode.

11. The system of claim 10, wherein the microphone is an omnidirectional microphone disposed on the camera.

12. The system of claim 11, wherein the microphone has an SNR greater than 60 dB.

13. The system of claim 12, wherein the microphone operates using a voltage supply less than 3V DC.

14. The system of claim 13, wherein the microphone has a sensitivity of −40±3 dB at 1 KHz.

15. The system of claim 10, wherein the detected triggering event or activity can be at least one of a scream, shouting, and breaking glass.

16. The system of claim 10, wherein the detected triggering event or activity can be at least one of an explosion, crash, slamming, siren, and noise made by an animal.

17. The system of claim 10, wherein the predetermined period is within a range between 5 seconds and 30 seconds.

18. The system of claim 10, wherein the timer is further configured to trigger a transition of the camera, in the event that no new activity is detected.

19. A non-transitory computer-readable medium having embodied thereon a program, the program being executable by a processor to perform a method for activity based video recording, the method comprising:
receiving an amplified signal to improve sensitivity, the amplified signal being produced by a circuit using an analog differential signal, the analog differential signal being received from a microphone, the circuit comprising:
a first opamp receiving the analog differential signal from the microphone,
a second opamp coupled to the first opamp, and
a digital potentiometer coupled to the second opamp;
converting the amplified signal to a digital signal;
intelligently detecting that a triggering event or activity is occurring that warrants a video recording, using the digital signal;
causing a camera to enter a capture video mode comprising a variable enabled period based on a detected type of the triggering event or activity, the variable enabled period comprising a predetermined period for the camera to remain in the capture video mode for the detected type of triggering event or activity;
recording video in response to detecting the triggering event or activity, resulting in a captured video;
storing the recorded video;
prepending a plurality of time-stamped historical video frames to the recorded video; and
placing the camera into power saving mode.

* * * * *